(12) United States Patent
Weiler

(10) Patent No.: US 6,217,029 B1
(45) Date of Patent: Apr. 17, 2001

(54) SEAL ARRANGEMENT FOR A PISTON ROD

(75) Inventor: Werner Weiler, Lichtenwald (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/130,602

(22) Filed: Aug. 7, 1998

(30) Foreign Application Priority Data

Aug. 8, 1997 (DE) ............................................. 197 34 497

(51) Int. Cl.⁷ ...................................................... F16J 15/24
(52) U.S. Cl. ........................ 277/434; 277/165; 277/153; 277/137
(58) Field of Search ..................................... 271/165, 589, 271/434, 435, 448, 468, 581, 582

(56) References Cited

U.S. PATENT DOCUMENTS

| | | | |
|---|---|---|---|
| 3,860,250 | * 1/1975 | Lundquist | 277/165 |
| 4,179,131 | * 12/1979 | Nussbaumer | 277/165 |
| 4,364,573 | * 12/1982 | Gautier et al. | 277/153 |
| 5,149,107 | 9/1992 | Maringer et al. | |
| 5,291,974 | 3/1994 | Bianchi | |
| 5,433,452 | * 7/1995 | Edlund et al. | 277/165 |
| 5,820,130 | * 10/1998 | Zakharov | 277/337 |

FOREIGN PATENT DOCUMENTS

| | | |
|---|---|---|
| 0 032 988 | 8/1981 | (DE) . |
| 0 408 177 | 1/1991 | (EP) . |
| 0 434 908 | 7/1991 | (EP) . |
| 2 371 618 | 6/1987 | (FR) . |
| WO 90/00693 | 1/1990 | (WO) . |
| WO 91/19920 | 12/1991 | (WO) . |

OTHER PUBLICATIONS

"Kolbendichtungen SIMKO 300", Antriebstechnik 33, (1994) Nr. 1–2, p. 67.

* cited by examiner

*Primary Examiner*—Anthony Knight
*Assistant Examiner*—Mark Williams
(74) *Attorney, Agent, or Firm*—Klaus J. Bach

(57) ABSTRACT

In a seal arrangement for sealing a piston rod particularly for a shock absorber of a motor vehicle, where the piston rod is supported in a cylinder so as to be axially movable therein and a slide seal ring is supported in the cylinder in engagement with the piston rod for sealing the piston rod, at least two seal elements are supported in the cylinder so as to be arranged around, and adjacent to, the slide seal ring and all are disposed in a common radial plane extending normal to the axis of the piston rod for pressing the slide seal ring into sealing engagement with the piston rod.

5 Claims, 1 Drawing Sheet

SEAL ARRANGEMENT FOR A PISTON ROD

BACKGROUND OF THE INVENTION

The invention relates to a seal arrangement for a piston rod, particularly for a shock absorber of a motor vehicle wherein the piston rod is arranged in a cylinder so as to be axially movable therein and at least two seal elements are provided between the piston rod and the inner wall of the cylinder.

Such an arrangement is known, for example, from EP-A 00 32 988. The seal arrangement shown in this publication comprises a first seal ring in the form of a sleeve which includes a sealing lip in contact with the outer surface of the piston rod. A part of the sleeve extends around a second seal ring which is axially spaced from the first seal ring and is also in contact with the piston rod.

This arrangement has a disadvantage in that the first seal ring has an irregular cross-sectional shape and its manufacture is therefore relatively expensive. Because of the irregular shape, also the tensions in the seal ring material are not uniform; there is the danger of rupture in areas which are subjected to high tensions. Also, it is not insured that the pressure required for an effective seal is always present at the seal lip over a long period of operation.

It is furthermore disadvantageous that the second seal ring, although improving the sealing effect, increases the friction at the surface of the piston rod so that a greater force is required for moving the piston rod. Because of the greater force required for moving the piston, the material wear is also increased.

It is the object of the present invention to provide with simple means a seal arrangement which has little wear and operates reliably.

SUMMARY OF THE INVENTION

In a seal arrangement for sealing a piston rod, particularly for a shock absorber of a motor vehicle, where the piston rod is supported in a cylinder so as to be axially movable therein and a slide seal ring is supported in the cylinder in engagement with the piston rod for sealing the piston rod, at least two seal elements are supported in the cylinder so as to be arranged around, and adjacent to, the slide seal ring and all are disposed in a common radial plane extending normal to the axis of the piston rod for pressing the slide seal ring into sealing engagement with the piston rod.

The single slide ring disposed immediately adjacent the piston rod reduces the friction forces between the piston rod and the seal arrangement and consequently, also the wear of the seal ring sealing edge.

It is furthermore advantageous that, with the arrangement of several seal rings and elements in a radial array adjacent one another, the spring performance graph of the whole seal arrangement is relatively flat. This indicates that even relatively large spring travel distances within the seal arrangement result in only small changes of the contact pressure of the seal ring arrangement with respect to the piston rod. This also means that relatively large assembly tolerances, temperature differences and wear can be accommodated without large changes of the seal force or, respectively, the friction force in axial direction of the piston rod.

The seal arrangement can be manufactured inexpensively using standard components. Seal rings of complicated cross-sectional geometry are not needed.

The slide seal preferably consists of Teflon® which has a low friction coefficient so that the friction forces are relatively low.

Preferably, the common radial plane is at the same time the symmetry plane of each seal element or ring. With this arrangement, a symmetrical and uniform force distribution within the seal arrangement is achieved and the pressure on the outer surface of the piston rod remains constant whereby the chances of material fatigue are greatly reduced and a uniform sealing effect is obtained over a long period of operation.

The seal elements are preferably O-rings with circular cross-sections. The slide seal ring has preferably an essentially rectangular cross-section with a radially inner projection which is disposed adjacent the piston rod so that the contact pressure of the slide seal ring on the piston rod is increased and the seal effect is improved. Because of the small friction coefficient of the slide seal ring, the friction forces generated by movement of the piston rod in axial direction are relatively small inspite of a high contact pressure. In place of two O-rings, elements with other than circular cross-section can be used.

The seal elements and the slide seal ring are preferably supported in a seal support structure such that the radial arrangement of the rings can be provided and maintained in a simple manner and the direction of the engagement pressure normal to the axis of the piston rod can be accurately established.

Further advantages and suitable embodiments will become more readily apparent from the following description of the invention on the basis of the accompanying drawings.

DESCRIPTION OF A PREFERRED EMBODIMENT

Figure 1:
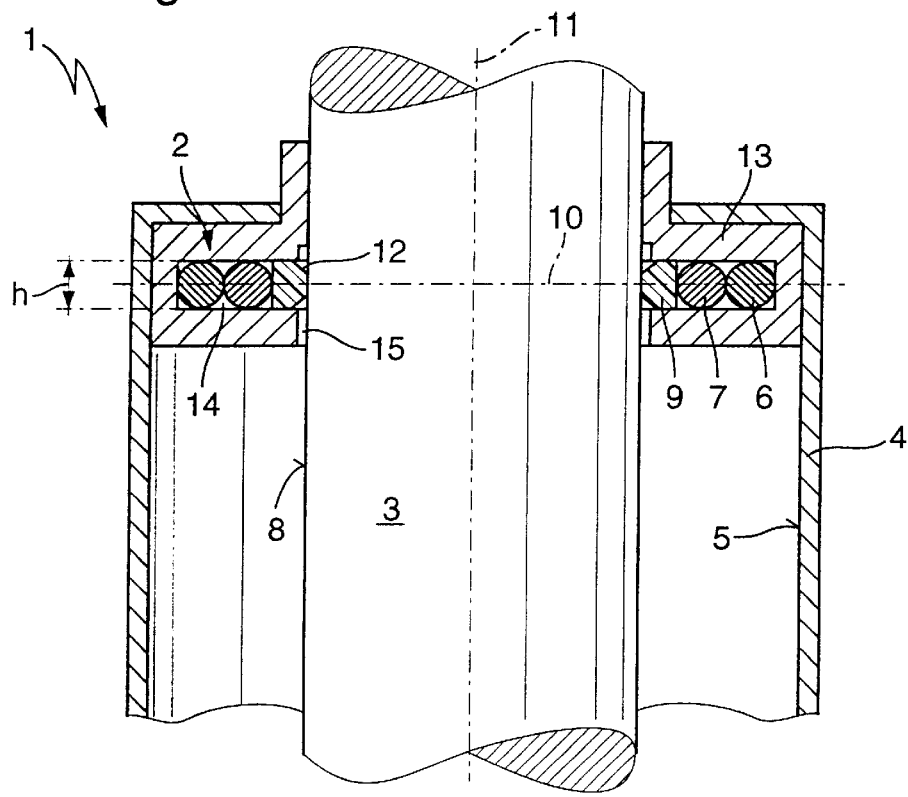
FIG. 1 is a side view of the seal arrangement according to the invention.

FIG. 1 shows a seal arrangement 2 for sealing a piston rod 3 in a shock absorber 1 of a motor vehicle. The piston rod 3 is supported in a cylinder 4 so as to be axially movable therein. The seal arrangement 2 is firmly positioned in a flange-like seal support element 13 disposed between the inner wall 5 of the cylinder 4 and the outer surface 8 of the piston rod 3. The arrangement is axially symmetrical as indicated by the dash-dotted axis 11.

The seal components of the seal arrangement comprise two seal elements 6, 7 and a slide seal ring 9. The annular seal elements 6, 7 have a circular cross-section and are disposed radially adjacent each other in a groove 14 formed in the seal support element 13. The seal elements 6, 7 consists of an elastomer and are arranged radially around the slide seal ring 9. The slide seal ring 9 consists of a material which has a low friction coefficient, especially Teflon®, and is radially surrounded by the seal elements 6, 7 and disposed in contact with the outer surface 8 of the piston rod 3. The slide seal ring 9 has an essentially rectangular cross-section with a wedge-like projection 12 at its radially inner end with which it engages the piston rod 3. The wedge-like projection 12 increases the engagement pressure with the piston rod for an improved sealing effect.

The seal components 6, 7, 9 are shown disposed directly adjacent one another. But it is also possible to arrange other components such as support elements between adjacent seal components.

The seal components 6, 7, 9 are disposed in an annular groove 14 formed in the seal support element 13. All seal components have essentially the same axial width h corresponding to the width of the annular groove 14 so that the seal components are contained in the annular groove 14 without axial play. In this arrangement, the plane of symmetry of each seal component coincides with the same radial plane 10 extending normal to the axis 11 of the piston rod 3. The direction of the contact pressure normal to the outer surface 8 of the piston rod 3 is consequently accurately predetermined.

The radial depth of the annular groove 14 corresponds essentially to the sum of the radial extensions of all the seal components 6, 7, 9 so that all the seal components are received essentially fully in the annular groove 14 and are firmly retained therein. The seal support element 13 includes, at the side adjacent the outer surface 8 of the piston rod 3, recesses 15 in the groove walls for receiving shock absorber fluid.

The radial stacking of the two seal elements 6, 7 of elastomer material provides for a radial spring force with a relatively flat overall spring performance line. FIG. 9 shows the spring force distribution 17, that is consequently, the engagement force provided by the two adjacent seal elements 6, 7 depending on the radial compression length of the seal elements 6, 7. A change Δs of the radial compression length because of a temperature increase or a reduction resulting from wear causes only a relatively small change $\Delta F_2$ of the radial engagement force because of the flatness of the spring performance line. The seal arrangement according to the invention is therefore relatively insensitive with respect to heat or wear effects so that the seal engagement force remains essentially constant over a long period of operation.

Figure 2:
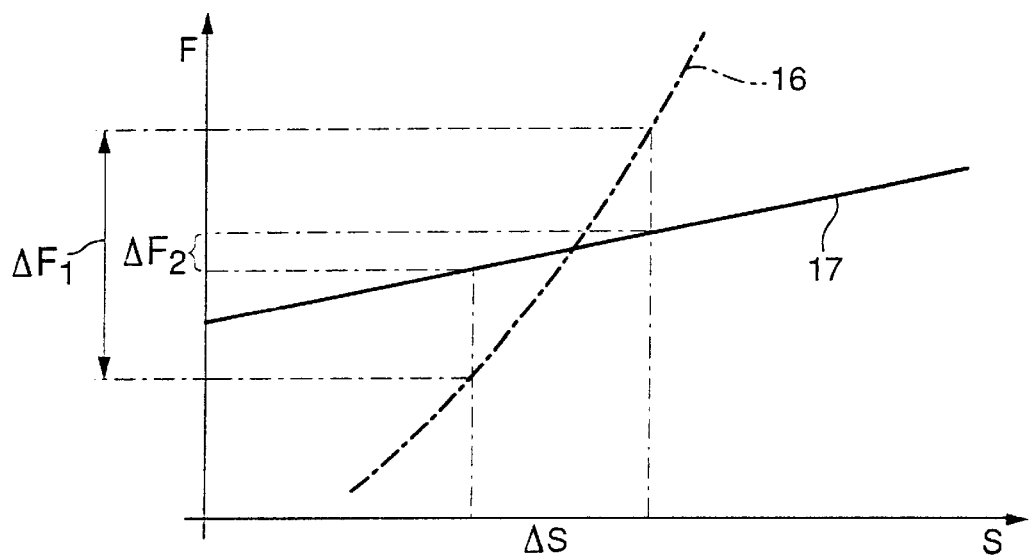
FIG. 2 shows a spring performance graph of the seal arrangement.

FIG. 2 shows also the spring performance line 16 of seal arrangements known in the field which, as apparent from FIG. 2, have a relatively steep slope: A change Δs in the prior seal arrangements causes, in accordance with the performance line 16, a change in the radial engagement force of $\Delta F_1$, which is large as compared to $\Delta F_2$.

It may be advantageous to use more than two seal elements of an elastomer material in a radial array in order to provide a desired spring performance line 17.

What is claimed is:

1. A seal arrangement for sealing a piston rod in a cylinder wall so as to be axially movable therein, a slide seal ring supported in said cylinder wall in engagement with said piston rod for sealing said piston rod, and at least two seal elements supported in said cylinder wall so as to be arranged around, and adjacent to, said slide seal ring and said at least two seal elements each having a circular cross-section in a cross-sectional plane including the axis of said piston rod, and each of the seal elements and the slide seal being disposed in a seal support element mounted in said cylinder in a radial plane extending normal to the axis of said piston rod for pressing said slide seal ring into sealing engagement with said piston rod.

2. A seal arrangement according to claim 1, wherein said slide seal ring consists of Teflon®.

3. A seal arrangement according to claim 1, wherein said seal elements and said slide seal ring all have about the same axial width.

4. A seal arrangement according to claim 1, wherein said common radial plane is also a symmetry plane for each of said seal elements and said slide seal ring.

5. A seal arrangement according to claim 1, wherein said slide seal ring is essentially rectangular in cross-section with a radial projection at its radially inner surface, said radial projection having a wedge-shaped cross-section to provide an annular seal lip in contact with said piston rod.

* * * * *